J. W. SHUTE.
RIM CONTRACTOR OR EXPANDER.
APPLICATION FILED NOV. 27, 1918.
1,351,406.
Patented Aug. 31, 1920.
2 SHEETS—SHEET 1.
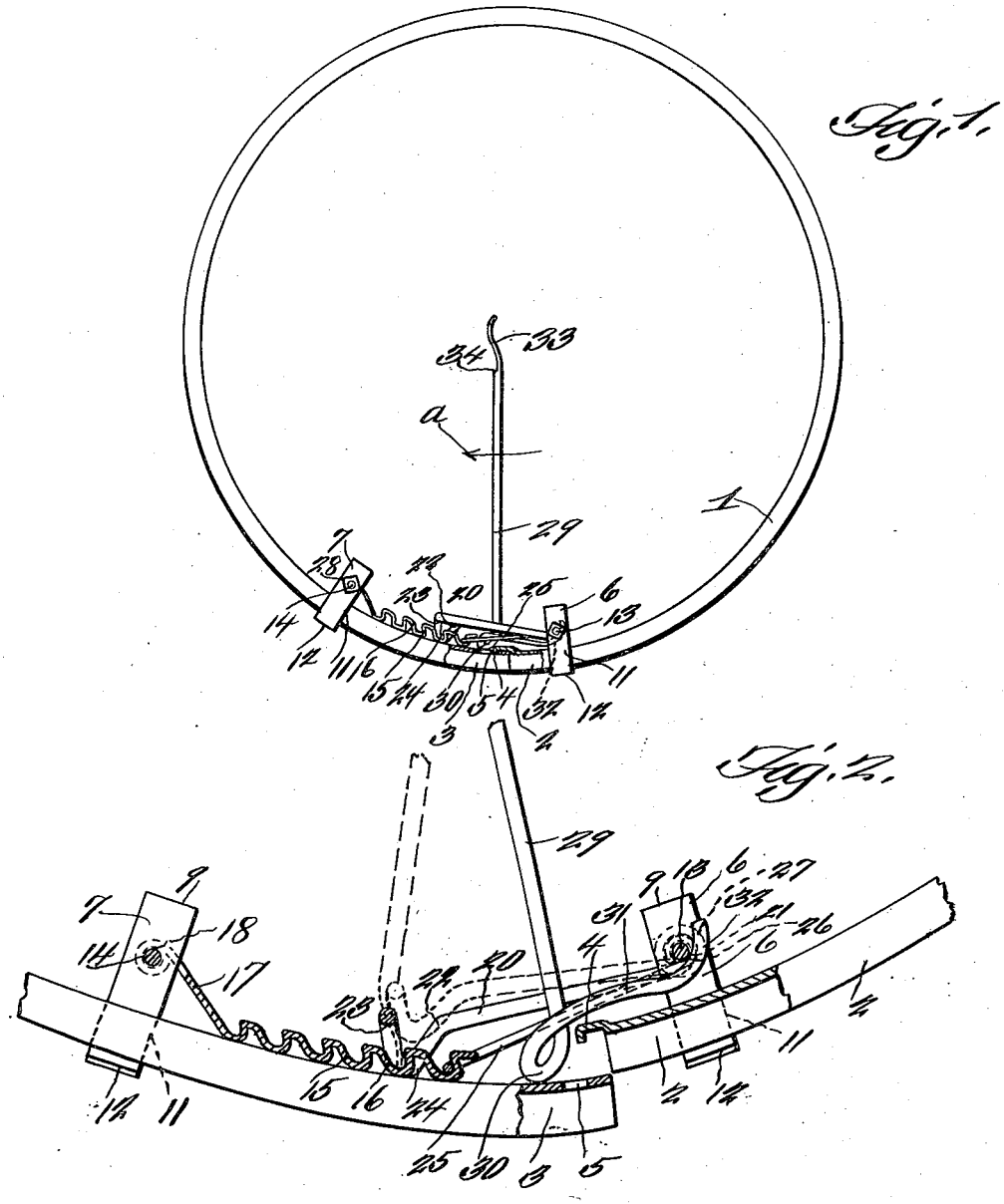

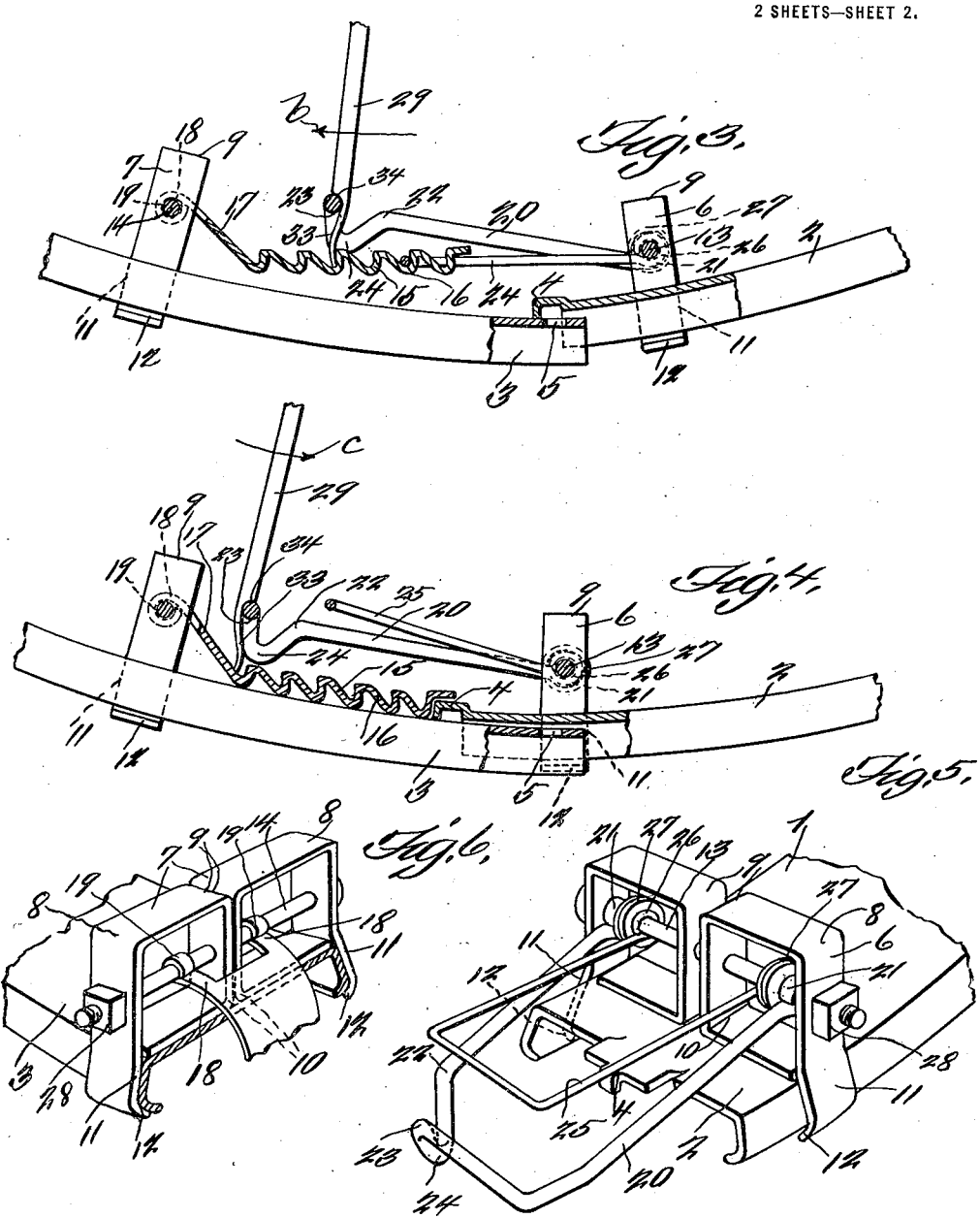

UNITED STATES PATENT OFFICE.

JOHN W. SHUTE, OF BISHOP, CALIFORNIA.

RIM CONTRACTOR OR EXPANDER.

1,351,406.  Specification of Letters Patent.  Patented Aug. 31, 1920.

Application filed November 27, 1918. Serial No. 264,407.

*To all whom it may concern:*

Be it known that I, JOHN W. SHUTE, a citizen of the United States, residing at Bishop, in the county of Inyo, State of California, have invented a new and useful Rim Contractor or Expander; and I do hereby declare the following to be a full, clear, and exact description of the invention, such as will enable others skilled in the art to which it appertains to make and use the same.

This invention relates to an improved rim contractor and expander, and an object of the invention is to provide a device for contracting and expanding a demountable wheel rim, whereby the tire may be applied and removed on and from the rim.

A further object of the invention is to provide a rim contracting appliance which is simple, efficient and practical in construction comprising bracket members clamped on the rim detachably adjacent the locked ends of the rim and connections between the bracket members to hold the rim contracted step by step, it being a further aim to provide a tool for coöperating with one of the brackets to break the lock connections between the ends of the rim and to coöperate with the connections for contracting and expanding the rim.

In practical fields the details of construction may necessitate alterations falling within the scope of what is claimed.

The invention comprises further features and combination of parts as hereinafter set forth, shown in the drawings and claimed.

In the drawings:—

Figure 1 is a view in side elevation of tire rim showing the contracting appliance applied, and the tool in the act of breaking the lock connection, a portion of the rim being in section.

Fig. 2 is an enlarged detail view of the adjacent ends of the rim, parts thereof in section, and the contracting appliance applied parts thereof in elevation and parts in section, a tool being shown in the position it assumes after having broken the lock connection between the ends of the rim.

Fig. 3 is an enlarged detailed sectional view through the adjacent ends of the rim and the contracting device, showing a tool in interengaged position in the contracting device so that a movement of the tool in one direction will cause a contraction of the rim.

Fig. 4 is a view similar to Fig. 3, showing the tool coöperating with the contracting appliance for expanding the rim.

Fig. 5 is an enlarged detail view of one end of the rim showing the bracket members detachably connected thereto, and the loops applied to the bracket members for holding the rim contracted.

Fig. 6 is an enlarged detail view of the opposite end of the rim showing a second pair of bracket members applied for the support of a rack.

Referring more especially to the drawings 1 designates an automobile wheel tire rim having its adjacent ends 2 and 3 detachably latched together by the hook and slot connections 4 and 5. Suitable brackets 6 and 7 are provided in pairs, one pair for the end 2 of the rim, and the other pair for the opposite end portion of the rim. The brackets of each pair are similar in construction, and each bracket is constructed from a single piece of sheet metal bent upon itself as at 8, 9 and 10 to form a rectangle. However, the outer portions of the brackets of each pair terminate in tongues 11 which have clencher flanges 12, so as to overlie and securely engage the flanges of the tire rim, as shown clearly in Figs. 5 and 6. By means of the bolts 13 and 14 the rectangular brackets of both pairs are clamped together, so that the tongues 11 will bind against the opposite flanges of the tire rim, and hold the bracket members securely or firmly in place. A suitable rack constructed of any suitable material preferably sheet metal is provided. This rack 15 is bent as shown to form the teeth 16 and the end portion 17 of the rack terminates in forks 18, which are turned into eyes 19 through which the bolt 14 extends. A heavy rigid wire loop 20 has its arms terminating in eyes 21 pivotally engaging the bolt 13. One arm and a portion of the transverse part of the loop 20 are bent as at 22 and 23, to provide a supporting leg 24 extending toward the inner surface of the rim and engaging the rim to one side of the rack, to support the transverse part of the loop super-imposed above the rack. A second wire loop 25 has it arms turned into eyes 26 fulcrumed upon the bolt 13. Suitable washers 27 are interposed between the eyes 21 and 26 to hold the loops spaced, owing to the loop 25 being smaller than the loop 20. By means of nuts 28 on the bolts 13 and 14 the bracket members are held in position. In order to break the rim a suitable tool 29 is provided. This tool is constructed from heavy rigid rod material, one end of which is bent to form a loop constituting a leg 30, and the portion 31 of said rod material beyond the leg 30 extends laterally of the body of the tool and terminates in a hook 32. The other end of the body of the tool terminates in a contracted chisel portion 33 (which is curved as shown), there being an adjoining shoulder 34. In order to break the lock connections between the adjacent ends of a clencher rim, the tool 29 is employed so that its leg 30 may engage the inner surface of the end 3 of the clencher rim with the hook 32 engaging between the bracket members 6 in contact with the bolt 13, as shown in Fig. 1, and then by pressure on the tool in the direction of the arrow $a$ the adjacent ends of the rim may be separated as in Fig. 2, after which they may assume the positions as shown in Fig. 3. In order that the ends of the rim may assume the position shown in Fig. 3 the tool 29 is reversed so that the chisel end 33 may engage one of the teeth of the rack, and the shoulder 34 in contact with the transverse part of the loop 20, so that by pressure on the tool in the direction of the arrow $b$ in Fig. 3, the transverse part of the loop 25 may ride over one of the teeth of the rack from the first notch of the rack to the second notch. This operation may be continued until the rim is contracted to the desired diameter. In order to expand the rim the tool is used as shown in Fig. 4, the chisel end of the tool engaging the rack, and the shoulder 34 engaging the loop 20, so that by pressure in the direction of the arrow $c$ the rim may be expanded. To further expand the rim the chisel end of the tool may engage any one of the other teeth of the rack.

The invention having been set forth what is claimed as new and useful is:—

In a device of the character described, comprising clamping jaws adapted to engage the adjacent ends of a demountable rim, said clamping jaws being provided with transversely disposed bolts, one of said bolts being provided with a pivoted toothed plate extending toward the adjacent end of the demountable rim, the other clamping jaws being provided with a transversely disposed pin, a bail pivoted to the last named clamping jaws and overlying the pivoted toothed plate, and a second bail pivoted to the last mentioned jaws and overlying the toothed plate at a point beyond the overlying portion of the first mentioned pivoted bail.

In testimony whereof I have signed my name to this specification in the presence of two subscribing witnesses.

JOHN W. SHUTE.

Witnesses:
 WM. P. MIDDLETON,
 L. B. HOEFER.